United States Patent
Perani et al.

(10) Patent No.: US 8,345,056 B2
(45) Date of Patent: *Jan. 1, 2013

(54) USER-DIRECTED PATH-BASED REGION FILLING

(75) Inventors: Michael Perani, San Rafael, CA (US); Scott Morrison, Portland, OR (US); Yan E. Schober, San Francisco, CA (US); Jian Zheng, Greenbrae, CA (US)

(73) Assignee: AUTODESK, Inc, San Rafael, CA (US)

( * ) Notice: Subject to any disclaimer, the term of this patent is extended or adjusted under 35 U.S.C. 154(b) by 1385 days.

This patent is subject to a terminal disclaimer.

(21) Appl. No.: 12/016,909

(22) Filed: Jan. 18, 2008

(65) Prior Publication Data

US 2009/0184966 A1    Jul. 23, 2009

(51) Int. Cl.
*G09G 5/00* (2006.01)

(52) U.S. Cl. ........ 345/581; 345/418; 345/419; 345/420; 345/441; 345/442; 345/582; 345/585; 345/619

(58) Field of Classification Search .................. None
See application file for complete search history.

(56) References Cited

U.S. PATENT DOCUMENTS

| | | | | |
|---|---|---|---|---|
| 4,189,743 | A * | 2/1980 | Schure et al. | 348/577 |
| 5,016,001 | A * | 5/1991 | Minagawa et al. | 345/442 |
| 2006/0284871 | A1 * | 12/2006 | Kee et al. | 345/423 |
| 2007/0002042 | A1 * | 1/2007 | Baraff et al. | 345/420 |

OTHER PUBLICATIONS

Author: David Joshua Kurlander, Title: Graphical Editing by Example, pp. 1-234, Date: Jul. 1993 source: Columbia University Computer Science Department Technical Report CUCS-023-93.*

* cited by examiner

*Primary Examiner* — Kee M Tung
*Assistant Examiner* — Jwalant Amin
(74) *Attorney, Agent, or Firm* — Patterson & Sheridan, LLP

(57) ABSTRACT

A method for filling closed regions in a drawing using a region filling tool. Rather than selecting individual regions to fill, or filling based on style-by-layer techniques, the user creates a path or an area boundary to identify the regions to be filled. A graphics application may then fill each region that intersects the path or area boundary with a selected color or graphical style. In this manner, multiple regions in the drawing may be identified using one interaction with the region filling tool, allowing the user to more efficiently and intuitively fill regions in the drawing with the selected color or graphical style.

18 Claims, 17 Drawing Sheets

USER-DIRECTED PATH-BASED REGION FILLING

BACKGROUND OF THE INVENTION

1. Field of the Invention

The present invention generally relates to computer software. More specifically, the present invention relates to a graphics application configured for user-directed path-based region filling or matching criteria region filling.

2. Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable construct. Commonly, CAD applications can be used in conjunction with a graphics application to add colors to a CAD line drawing to compose a visually-pleasing scene or image. A graphics application generally includes a color palette or color wheel from which a user of the CAD application may choose a color to work with. Colors can then be applied to almost any object within the graphics model or drawing. Photo/video editing software tools provide similar features.

Furthermore, a vector graphics application is type of graphical design application. Vector graphics, also called geometric modeling or object-oriented graphics, refers to the use of geometrical primitives such as points, lines, curves, and polygons, which may be based upon mathematical equations, to represent images in computer graphics. Vector graphics are distinct from raster graphics. In raster graphics applications, images are represented as a collection of pixels or dots. A common feature of vector graphics applications is the ability to incorporate graphical styles in a vector-based drawing. A graphical style is a set of reusable appearance attributes. Graphical styles allow a user to quickly change the look and feel of an object. For example, a user can change an object's fill and stroke color, alter its transparency, and apply various effects in one step. An example of a graphical style includes a "polka dot" graphical style, such that applying the polka dot graphical style to an object fills the object with a polka dot pattern.

A common feature of graphics applications is the ability to "fill" a region with a color or graphical style using a region filling tool. Most commonly, the tool used for this feature is a "paint bucket" and is often referred to as a "fill tool." Generally, a user chooses the fill tool from a list of available tools. The user then selects the color or graphical style that that represents the color or graphical style the user wishes to apply to a region. The currently selected color or graphical style may appear in a dialog box. The user of the graphics application may then apply the selected color or graphical style to closed regions in the graphics drawing.

However, applying colors and graphical styles to closed regions has proven to be laborious. Prior art techniques for region filling generally only allow a user to fill a single region at a time. In the prior art, region filling using vector and raster based systems has been based on "seeding" or point sampling an area and flooding the area until geometric bounds are reached. Using prior art techniques, a user that desires to fill multiple regions with the same color or graphical style must apply the color or graphical style to each region individually, a process that is tedious if many regions are to be filled with the same color or graphical style.

Other prior art techniques allow for applying a color or graphical style to multiple regions at once using a process known as style-by-layer. The original conception for this user interaction was to leverage the structure of a CAD drawing into layers to accelerate colorization. When using this prior art technique, it was assumed that most CAD drawings would contain a well organized layer structure and that the marks on a page would have a one-to-one correspondence with elements of the design. When the CAD drawing is colorized in the graphics application, colors or graphical styles could be applied simultaneously to all regions that are present in the same layer or to all regions that correspond to a particular element of the design. In practice though, a majority of CAD drawings do not exhibit the structure required for style-by-layer region filling. In particular, designs which include external references created by third parties frequently lack a strict adherence to layer organization rules. Even more prevalent are designs which are comprised solely of discrete lines and curves and are completely lacking in closed areas that represent a boundary of a physical material in the drawing. These types of drawings are known as unstructured drawings. Thus, even when using a style-by-layer technique for region filling, the colorization of unstructured drawings is an extremely repetitive task requiring the user to click inside each bounded area on the page the user wishes to colorize because of the lack of adherence to layer or element formalities. To efficiently use a style-by-layer technique, the user is burdened with the task of assuring that a drawing is consistently sorted by layer or element to permit efficient application of stylistic attributes.

Although these prior art techniques work as intended, these techniques have a significant limitation in that the user must apply a region fill to individual regions separately in unstructured drawings. In unstructured drawings with many regions to be filled with the same color or graphical style, the process is tedious and time-consuming.

Accordingly, there remains the need in the art for a technique for region filling that allows for the efficient filling of multiple regions with the same color or graphical style.

SUMMARY OF THE INVENTION

One embodiment of the invention provides a method of filling closed regions in a line drawing with a graphical style. This method may generally include parsing the line drawing to identify a collection of closed regions and generating a planar graph representation of the collection of closed regions, and receiving user input specifying a portion of the line drawing. This method may further include, determining, from the user input and the planar graph representation, a subset of the closed regions and applying the graphical style to the subset of the closed regions.

Another embodiment of the invention provides a method of identifying regions in a line drawing to fill with a graphical style. This method may generally include parsing the line drawing to identify a collection of closed regions and generating a planar graph representation of the collection of closed regions. This method may further include receiving a selection of a graphical style, matching criteria, and a seed region. This method may further include identifying one or more regions matching the seed region based on the matching criteria and the planar graph and applying the graphical style to the identified regions.

DETAILED DESCRIPTION OF THE PREFERRED EMBODIMENTS

Figure 1:
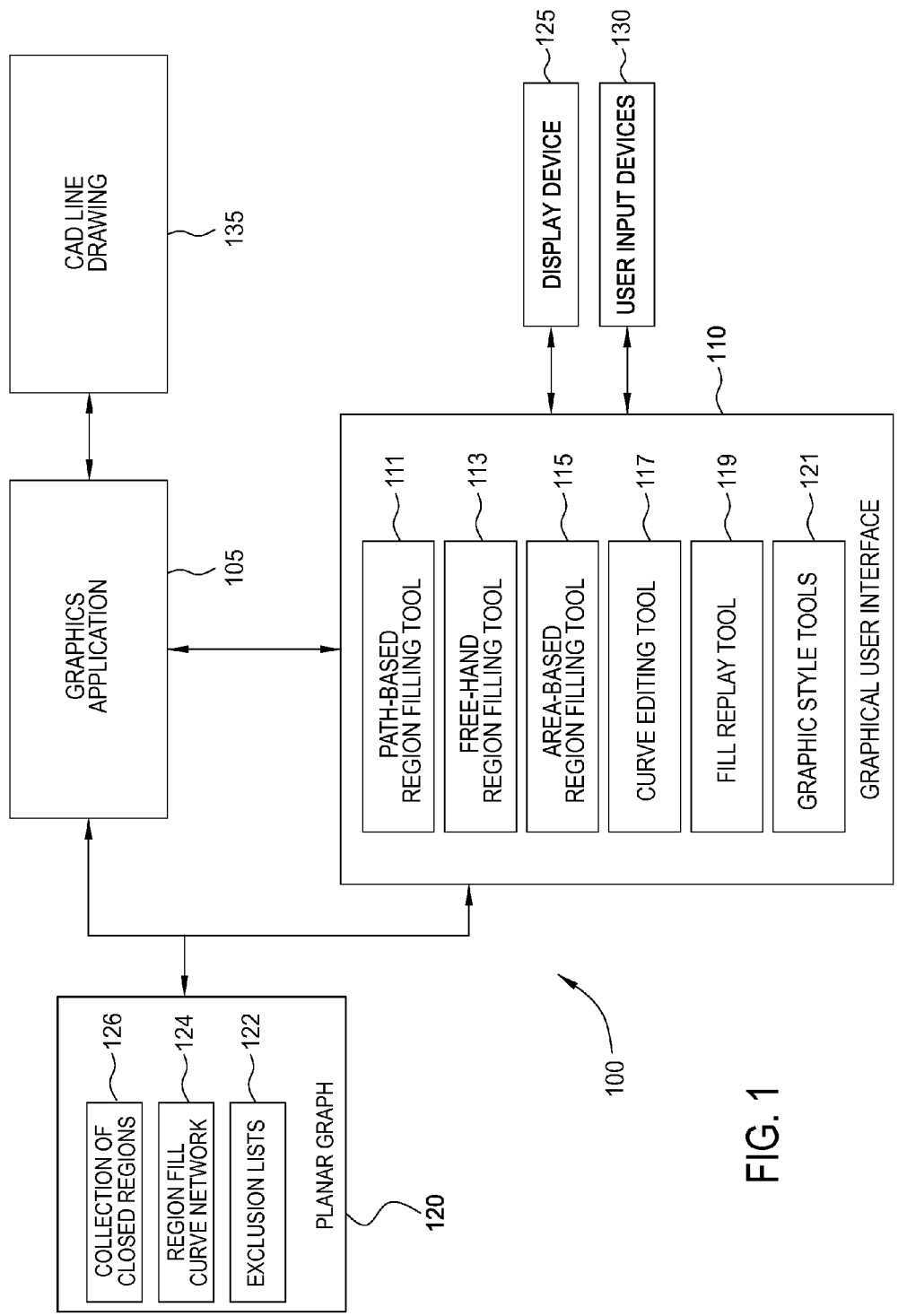
FIG. 1 is a block diagram illustrating components of a graphics application used in path-based region filling, according to one embodiment of the invention.

Embodiments of the invention provide a graphics application with a fill tool configured to fill multiple regions of a computer-aided design (CAD) drawing in a variety of ways. When the fill tool is activated, the appearance of a mouse cursor may change to resemble a paint bucket. The user may then use the paint bucket to apply a selected color or graphical style to closed regions of the CAD drawing. However, rather than simply filling multiple closed regions one at a time, multiple closed regions may have the selected color or graphical style applied at once. By configuring the graphics application to behave in this manner, a user may efficiently colorize many regions in a drawing. In one embodiment, the user may draw a path that intersects with each closed region of the CAD drawing that the user desires to apply a given style. The path itself may be a series of path segments or may be a free-form path. Similarly, a user may click and drag the mouse cursor to create a bounding box over a region of the CAD drawing. In such a case, the region fill tool may apply the desired style to each closed region covered by the bounding box. In another embodiment, the user may specify pattern matching criteria, e.g., by selecting a seed region. In such a case, the region fill tool may apply the desired style to each closed region in the drawing that matches with the seed region.

FIG. 1 is block diagram illustrating components of a graphics application used in path-based region filling, according to one embodiment of the invention. The components illustrated in system 100 may include computer software applications executing on existing computer systems, e.g., desktop computers, server computers, laptop computers, tablet computers, video game consoles, and the like. The software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with graphics application 105 at another physical location. Also, in one embodiment, graphics application 105 and graphical user interface 110 may be provided as an application program (or programs) stored on computer readable media such as a CD-ROM, DVD-ROM, flash memory module, or other tangible storage media.

As shown, the system 100 includes, without limitation, graphics application 105, graphical user interface 110, planar graph 120, user input devices 130, and a display device 125. Those skilled in the art will recognize, however, that the components shown in FIG. 1 are simplified to highlight aspects of the present invention and that a typical graphics application 105 and GUI interface 110 may include a broad variety of additional tools and features used to compose and manage a design or drawing. Graphics application 105 may be configured to allow users interacting with GUI interface 110 to compose graphical designs or drawings. Accordingly, graphics application 105 and GUI interface 110 may include programmed routines or instructions allowing users to create, edit, load, and save CAD designs or graphics drawings. User input devices 130 may include a mouse pointing device, a keyboard, a joystick or a video game controller and display device 125 may be a CRT or LCD display.

Also as shown, the planar graph 120 includes exclusion lists 122, a region fill curve network 124, and a collection of closed regions 126. Generally, a user may compose (or load) a CAD line drawing 135 using graphics application 105. Once composed, the graphics application may pre-process the CAD line drawing 135 to generate the planar graph 120. As is known, a planar graph is a graph that can be drawn where no edges intersect. When constructing a planer graph from lines that intersect, the lines are split at the intersection points. In one embodiment, pre-processing the CAD line drawing 135 may include identifying a collection of closed regions 126 present in the CAD line drawing 135. A closed region may be defined as the enclosed area defined by a continuous line or spline. For example, if the CAD line drawing 135 includes a square object and a line object that intersects two sides of the square object, the pre-processing would identify two closed regions. When pre-processing of the CAD line drawing 135 is complete, the CAD application 105 generates the planar graph 120 that includes the collection of closed regions 126. The user may interact with the fill-tools 111, 113, and 115 to apply various colorizations or graphical styles to the elements of the CAD drawing, based on an analysis of the planar graph 120. In one embodiment, for example, a user may create the region fill curve network 124 by defining by a collection of segments that define a path. In such a case, each closed region of the CAD line drawing 135 that intersects the path may be filled with the selected color or graphical style.

Graphical user interface 110 provides tools used to manipulate CAD designs and graphics drawings using graphics application 105. As shown in FIG. 1, graphical user interface 110 may include a path-based region filling tool 111, a free-hand region filling tool 113, an area-based region filling tool 115, a curve editing tool 117, a fill replay tool 119, and graphical style tools 121. Those skilled in the art will recognize, however, that the tools of GUI interface 110 shown in FIG. 1 are simplified to highlight aspects of the present invention and that a typical graphics application 105 and GUI interface 110 may include a broad variety of additional tools and features used to compose and manipulate CAD designs and graphics drawings.

In one embodiment, path-based region filling tool 111 may provide GUI elements that allow a user to fill multiple closed regions of CAD drawing that intersect a path defined by lines and curves. A user may interact with the path-based region filling tool 111 to construct a path that defines a region fill curve network 124, as described in greater detail with respect to FIG. 9. Regions intersected by the path are then filled with the selected color or graphical style.

In another embodiment, free-hand region filling tool 113 may provide GUI elements that allow a user to fill multiple regions that intersect a path created with free-hand motion of a user input device 130, for example, a mouse. A user may interact with the free-hand region filling tool 113 to construct a path that defines a region fill curve network 124, as described in greater detail with respect to FIG. 12. Regions intersected by the path are then filled with the selected color or graphical style.

In yet another embodiment, area-based region filling tool 115 may provide GUI elements that allow a user to fill multiple regions using a bounded area. A user may interact with the area-based region filling tool 115 to construct a bounded area, as described in greater detail with respect to FIGS. 10-11. In one embodiment, regions fully within the bounded area are filled with the selected color or graphical style. In a second embodiment, regions fully within the bounded area and regions that intersect the bounded area are filled with the selected color or graphical style.

Curve editing tool 117 may be used to modify the region fill curve network 124. That is, region fill curve networks 124 created using the path-based region filling tool 111, the free-hand region filling tool 113, or the area-based region filling tool 115, may be modified to change which regions are filled. Further, the user may change the style or colorization applied to drawing elements covered by a given region fill curve network 124 For example, if the region fill curve network 124 is a single line segment, then each region that intersects the line segment are filled with the selected color or graphical style. The user may use curve editing tool 117 to extend the length of the line segment that defines the region fill curve network 124. Extending the line segment may cause the line segment to intersect with more closed regions in CAD line drawing 135, causing more regions to be filled. Similarly, the curve editing tool 117 may be used to shorten the length of the line segment that defines the region fill curve network 124. Doing so may decrease the number of regions that intersect the region fill curve network 124, thus reducing the number of filled regions.

The user may also use exclusion lists 122 to exclude specified regions from being filled with the selected color or graphical style. Continuing with the above example, if the user created a region fill curve network 124 that included only one line segment, then each region intersected by the line segment would be filled with the selected color or graphical style. The curve editing tool 117 may be used to modify the exclusion list 122 associated with that region fill curve network 124. Adding a particular region to the exclusion list 122 causes the graphics application 105 to not fill the particular region added to the exclusion list with the selected color or graphical style, even though the particular region would otherwise be filled based on the region fill curve network 124. Exclusion lists 122 may be useful for a user who wishes to fill a string of adjacent regions with the same color or graphical style, but there are several regions along the string that are not to be filled (e.g., "holes" where the fill is not applied or where a different style or colorization is desired, such as an alternating sequence). Exclusion lists can be used with any of the region filling tools described herein, including the path-based region filling tool 111, the free-hand region filling tool 113, the area-based region filling tool 115, or a matching criteria region filling tool 123 (as shown in FIG. 2).

In another embodiment, the fill replay tool 119 may be useful for filling regions of two similar CAD drawings. The fill replay tool 119 allows modified drawings to be re-imported into the system and the region fills automatically recomputed. For example, a user may load a first CAD drawing into the graphics application 105 and a first planar graph is generated representing the first CAD drawing. The user may then use, for example, the path-based region filling tool 111 to create a region fill curve network 124 that defines the regions of the collection of closed regions 126 of the planar graph that are to be shaded. Then, a user may load a second CAD drawing into the graphics application 105 and a second planar graph is generated representing the second CAD drawing. The user wishes to fill similar regions in the second CAD drawing to the regions filled in the first CAD drawing. Using the fill replay tool 119, the user may apply the region fill curve network 124 generated for the first CAD drawing to the second CAD drawing. Regions of the second CAD drawing intersected by the region fill curve network 124, as determined using the second planar graph are filled with the selected color or graphical style.

Figure 2:
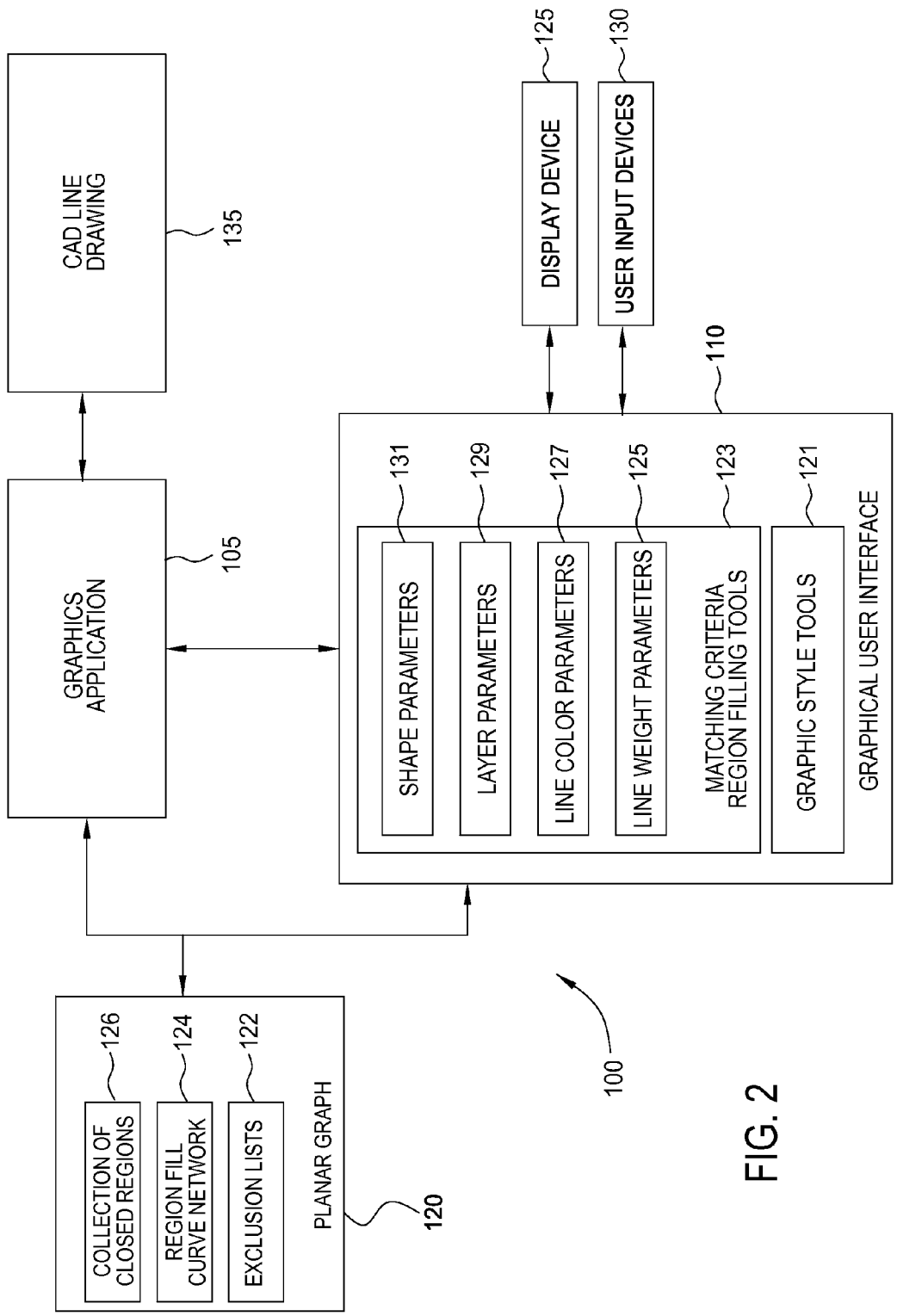
FIG. 2 is a block diagram illustrating components of a graphics application used in region filling using matching criteria, according to one embodiment of the invention.

FIG. 2 is block diagram illustrating components of a graphics application used in matching criteria region filling, according to one embodiment of the invention. The components illustrated in FIG. 2 are the same components illustrated by system 100 of FIG. 1, with different tools associated with the GUI interface 110.

As shown, GUI interface 110 includes graphical style tools 121 and matching criteria region filling tools 123. Matching criteria region filling tools 123 may allow a user to specify a variety of matching criteria including, e.g., line weight parameters 125, line color parameters 127, layer parameters 129, or shape parameters 131. When using matching criteria region filling tools 123, the user may define a set of parameters 125-131 for region matching. Once the criteria are set, the user then selects a "seed region." The seed region is the region to which other regions are compared to determine whether a "match" is found. If a region meets the parameters set with respect to the seed region, the region is also filled with the same color or graphical style as the seed region. In one embodiment, the graphics application 105 compares each closed region identified in the planar graph to the seed region based on the matching criteria. Sometimes, a region may be deemed to be a "match" based on the matching criteria, but the user would like to remove the fill from that region for stylistic reasons. In such a case, the user may remove the fill by specifying the unwanted regions from which to remove the fill. Similarly, a user can use an add button (shown in FIGS. 18-19) to add regions to the region fill curve network even though the regions are not "matches" based on the matching criteria. Examples of the individual matching criteria parameters are described in greater detail with reference to FIG. 14.

Figure 3:
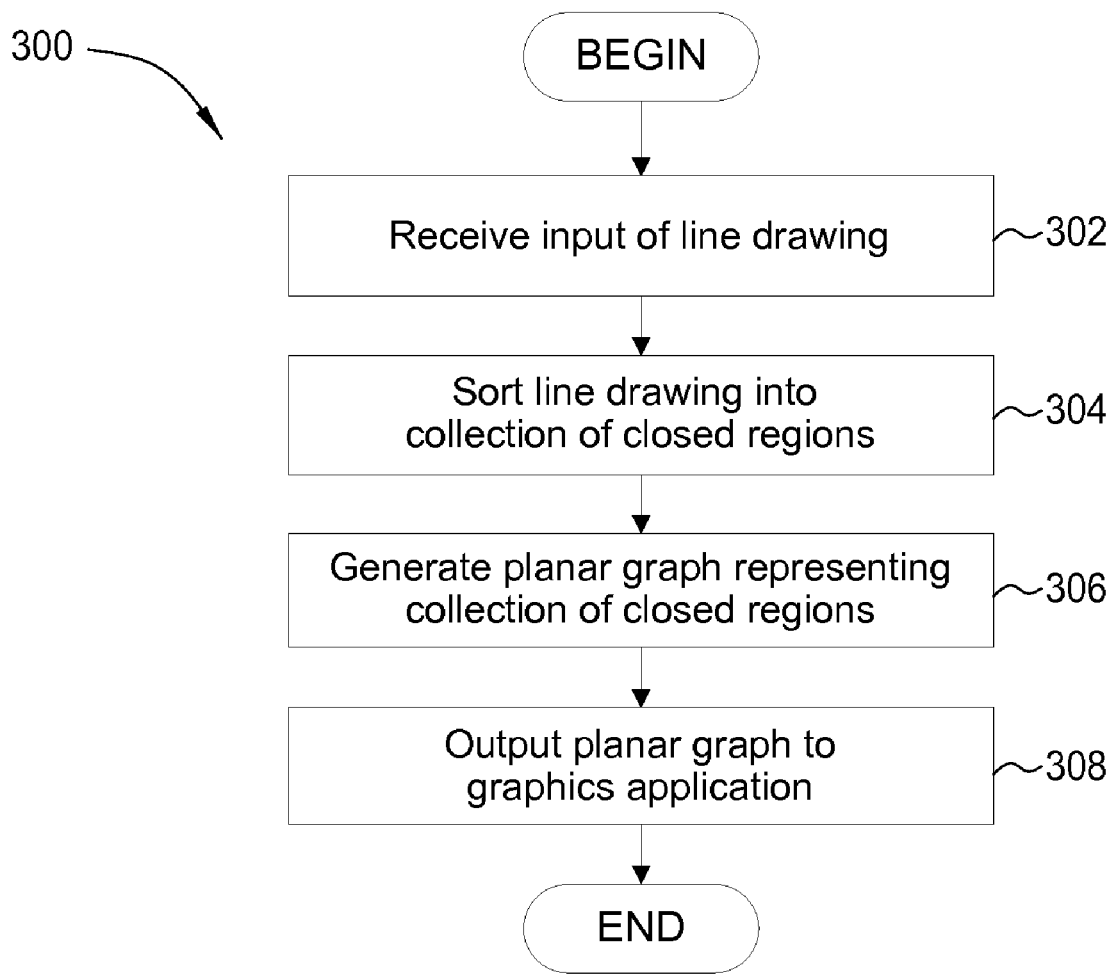
FIG. 3 is a flow chart illustrating a method for generating a planar graph representing a collection of closed regions in a line drawing, according to one embodiment of the invention.

FIG. 3 is a flow chart illustrating a method 300 for generating a planar graph representing a collection of closed regions in a line drawing, according to one embodiment of the invention. Persons skilled in the art will understand that even though the method is described in conjunction with the system of FIGS. 1 and 2, any system configured to perform the steps of the method illustrated in FIG. 3, in any order, is within the scope of the present invention. Further, persons skilled in the art will understand that the steps of the method described in FIG. 3 are only one embodiment of the present invention.

As shown, method 300 begins at step 302, where the graphics application receives an input of a line drawing. The step of receiving the line drawing may include loading a CAD line drawing created in a CAD application into the graphics application. At step 304, the graphics application parses the line drawing to identify a collection of closed regions, based on the line work present in the CAD drawing. The parsing of step 304 can be performed by any method known to those skilled in the art. At step 306, the graphics application generates a planar graph representing the collection of closed regions. In one embodiment, line weights associated with the line work persist in a drawing description associated with the planar graph. That is, this information may be preserved as part of the parsing process performed at step 304. In another embodiment, layer associations for each line segment of the input line drawing are preserved in the planar graph. At step 308, the graphics application stores the planar graph for use in subsequent region filling operations performed by the user. The user may then use the tools of the graphics application to colorize the planar graph using the techniques disclosed herein.

Figure 8:
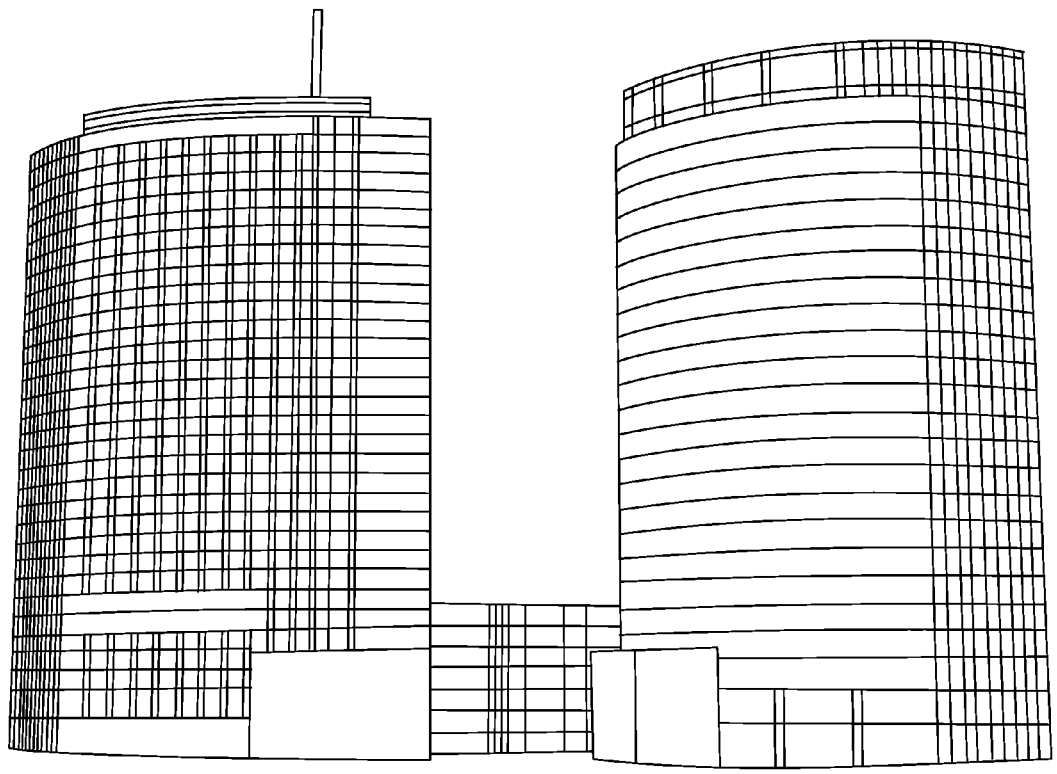
FIG. 8 illustrates an example of a line drawing to be colorized using a region filling tool, according to one embodiment of the invention.
Figure 9:
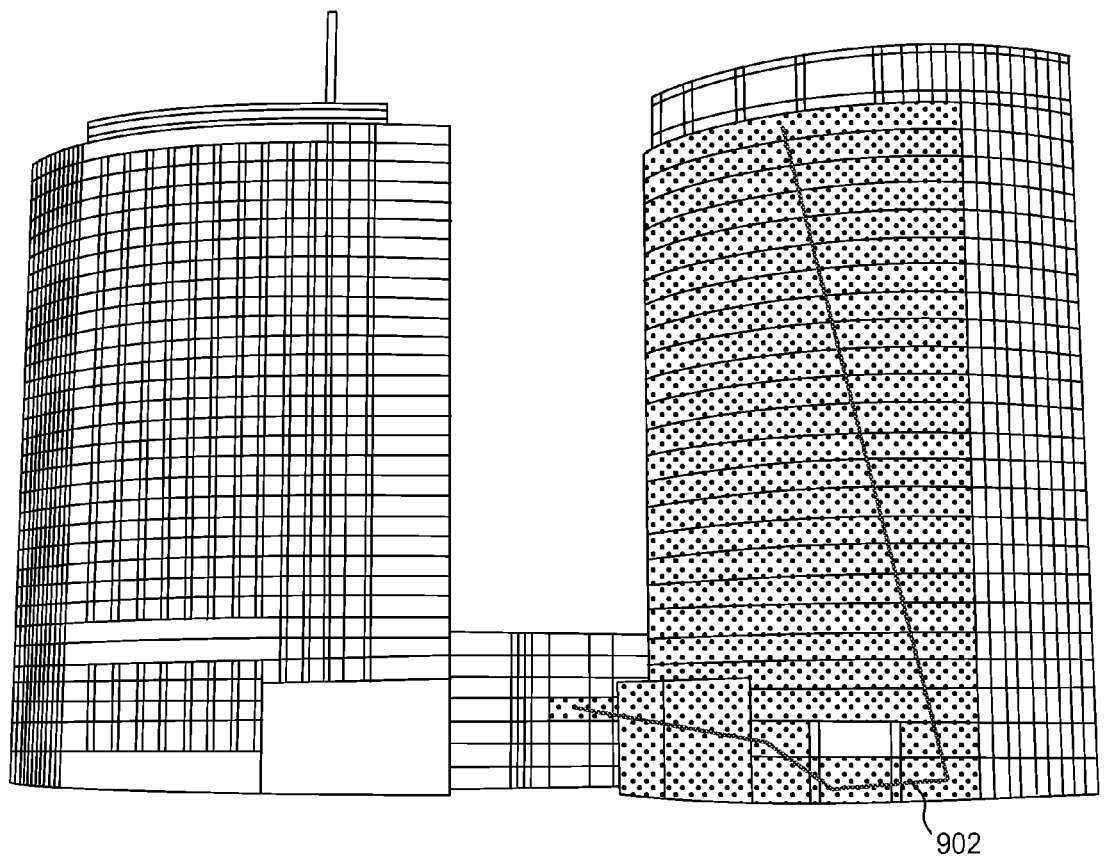
FIG. 9 illustrates an example of a line drawing colorized using a path-based region filling tool, according to one embodiment of the invention.
Figure 10:
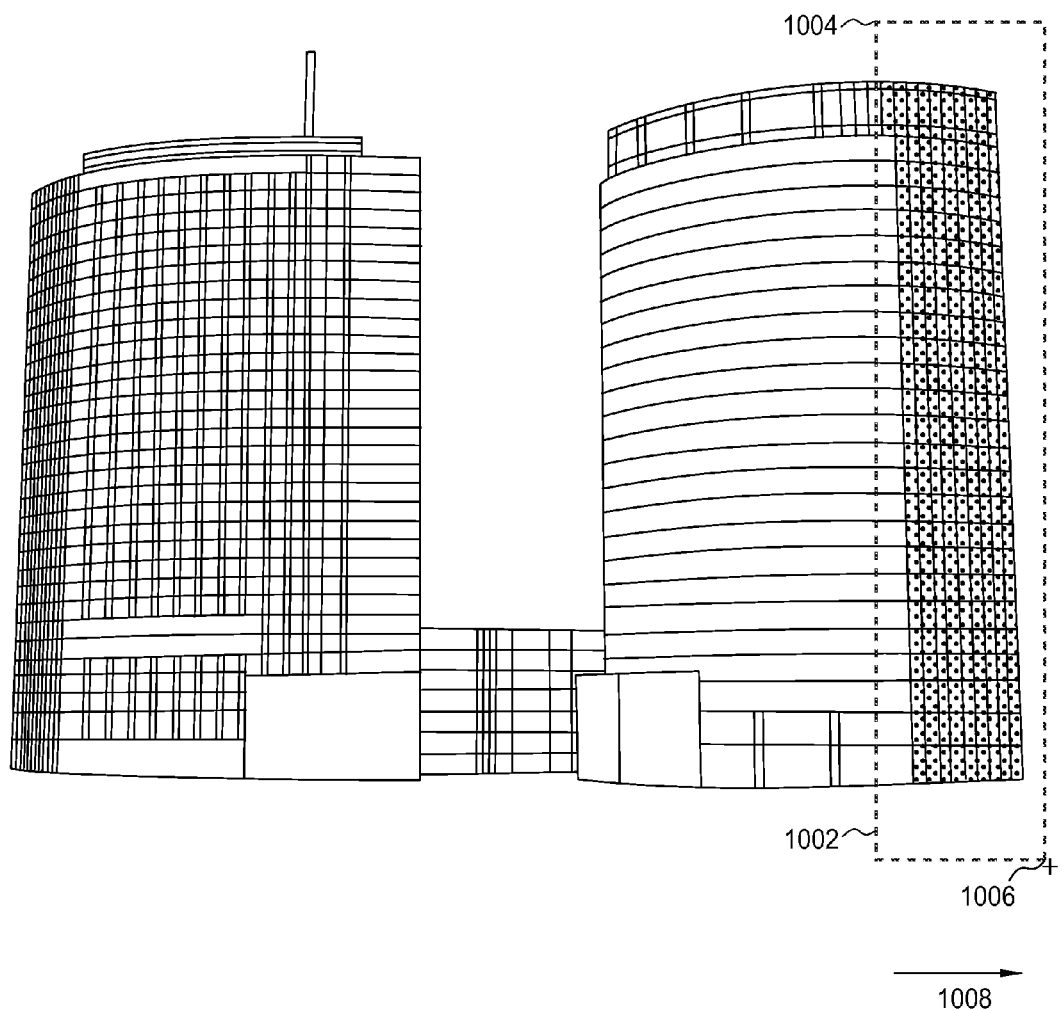
FIG. 10 illustrates an example of a line drawing colorized using an area-based region filling tool, according to one embodiment of the invention.
Figure 11:
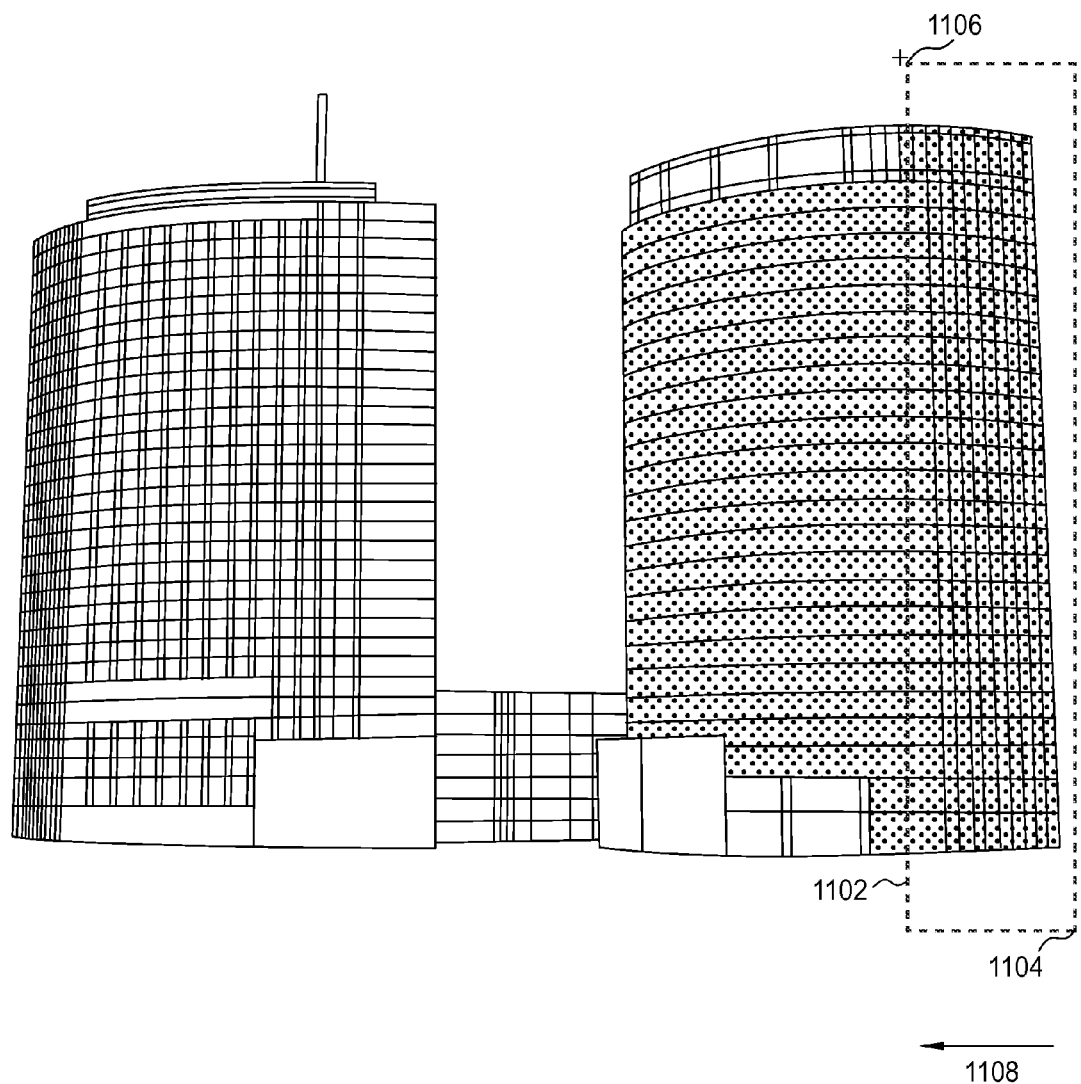
FIG. 11 illustrates an example of a line drawing colorized using an area-based region filling tool, according to one embodiment of the invention.

FIG. 8 illustrates an example of a line drawing of a building to be colorized using a region filling tool, according to one embodiment of the invention. The building depicted in FIG. 8 may have graphical styles or colors used to fill closed regions of this line drawing using the region filling methods described above, including path-based region filling (FIGS. 4 and 9), free-hand region filling (FIGS. 5 and 12), and area-based region filling (FIGS. 6 and 10-11).

Figure 4:
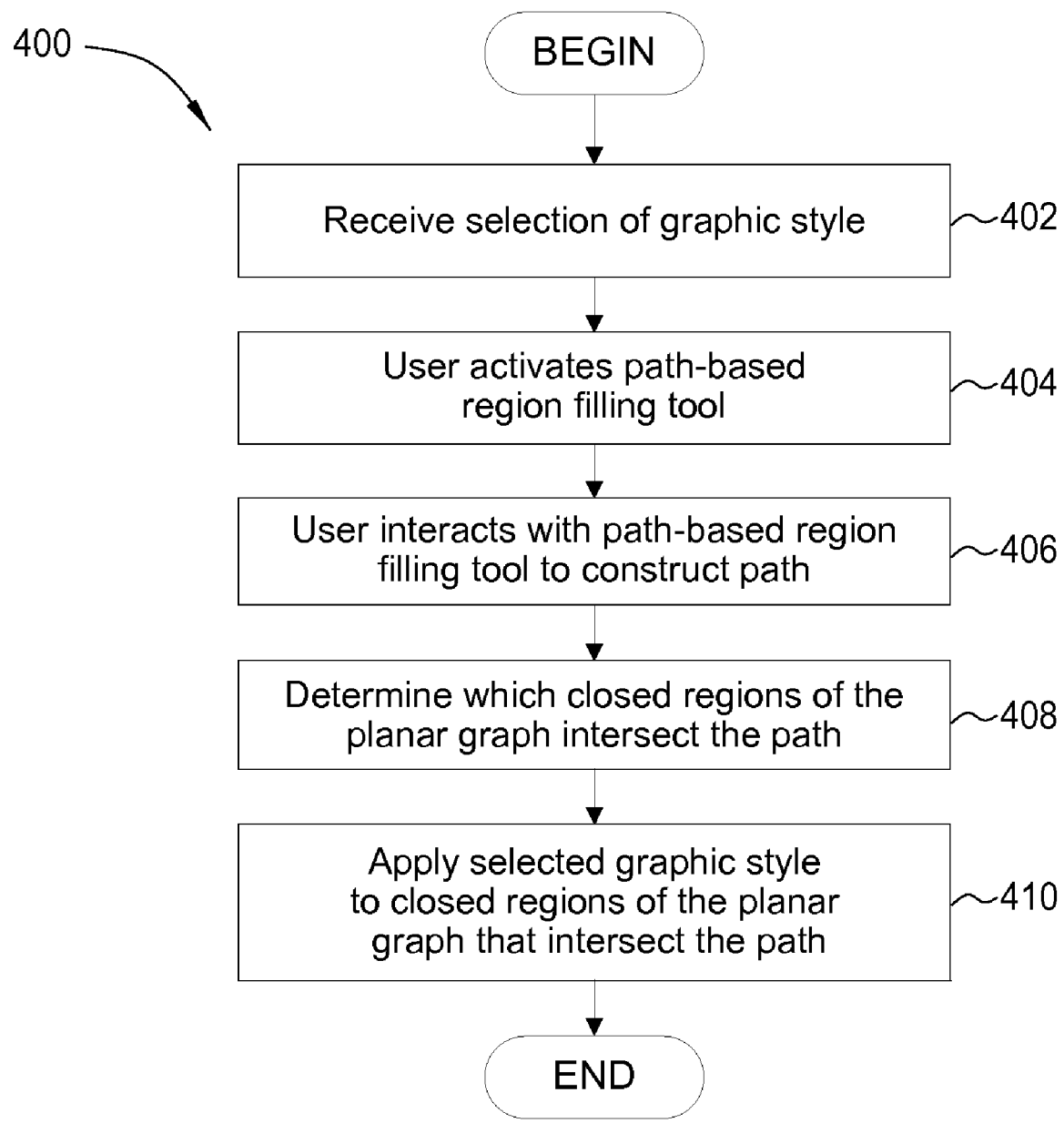
FIG. 4 is a flow chart illustrating a method for filling multiple regions of a CAD drawing using a path-based region filling tool, according to one embodiment of the invention.

FIG. 4 is a flow chart illustrating a method 400 for filling multiple regions using a path-based region filling tool, according to one embodiment of the invention. The method of FIG. 4 is described relative to an example shown in FIG. 9. As shown in FIG. 4, at step 402, the graphics application receives a selection of a graphical style. In one embodiment, the selection may be input by a user clicking on a particular graphical style from a list of available graphical styles in a graphical style library. In another embodiment, the selection of the graphical style of step 402 may be the selection of a color. In the example shown in FIG. 9, a "polka dot" graphical style has been selected. At step 404, the user activates the path-based region filling tool. At step 406, the user interacts with the path-based region filling tool to construct a path. With path-based filling, the user constructs lines and curves using standard drawing tools to create the path. In FIG. 9, the user has constructed a path 902. Illustratively, path 902 is not just a single line segment, but rather a path that includes four distinct line segments. At step 408, the graphics application determines which closed regions of the CAD drawing intersect the path, based on an analysis of the planar graph. Step 408 may be performed using any method known to persons skilled in the art. At step 410, the graphics application applies the selected graphical style to the closed regions of the CAD drawing that intersect the path. As shown in FIG. 9, for example, a polka dot graphical style has been applied to each closed region of the CAD drawing that intersects path 902. Path 902 can be selectively hidden or visible. The path-based region filling tool can be very useful for filling adjacent closed regions with the same graphical style or color.

Figure 5:
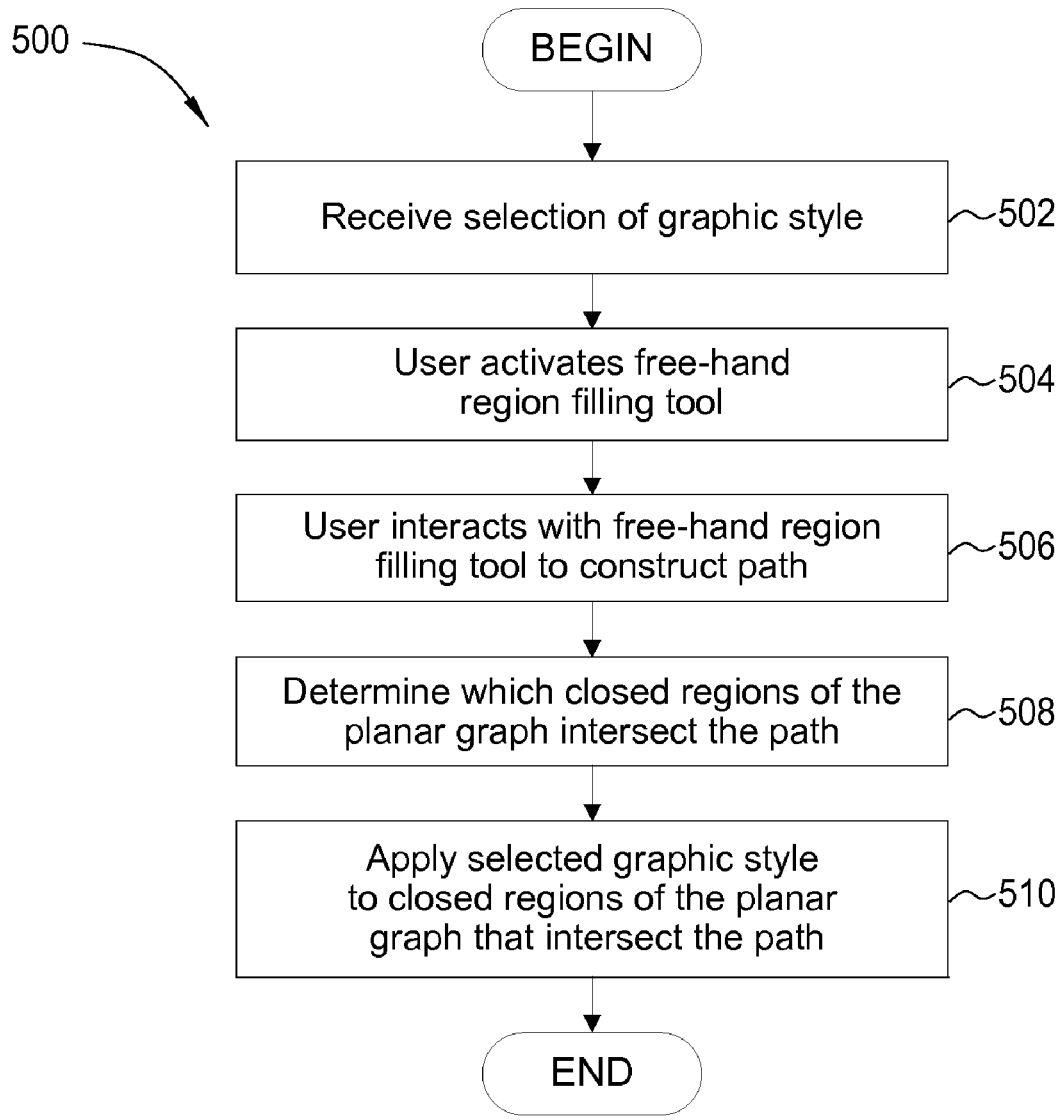
FIG. 5 is a flow chart illustrating a method for filling multiple regions of a CAD drawing using a free-hand region filling tool, according to one embodiment of the invention.
Figure 12:
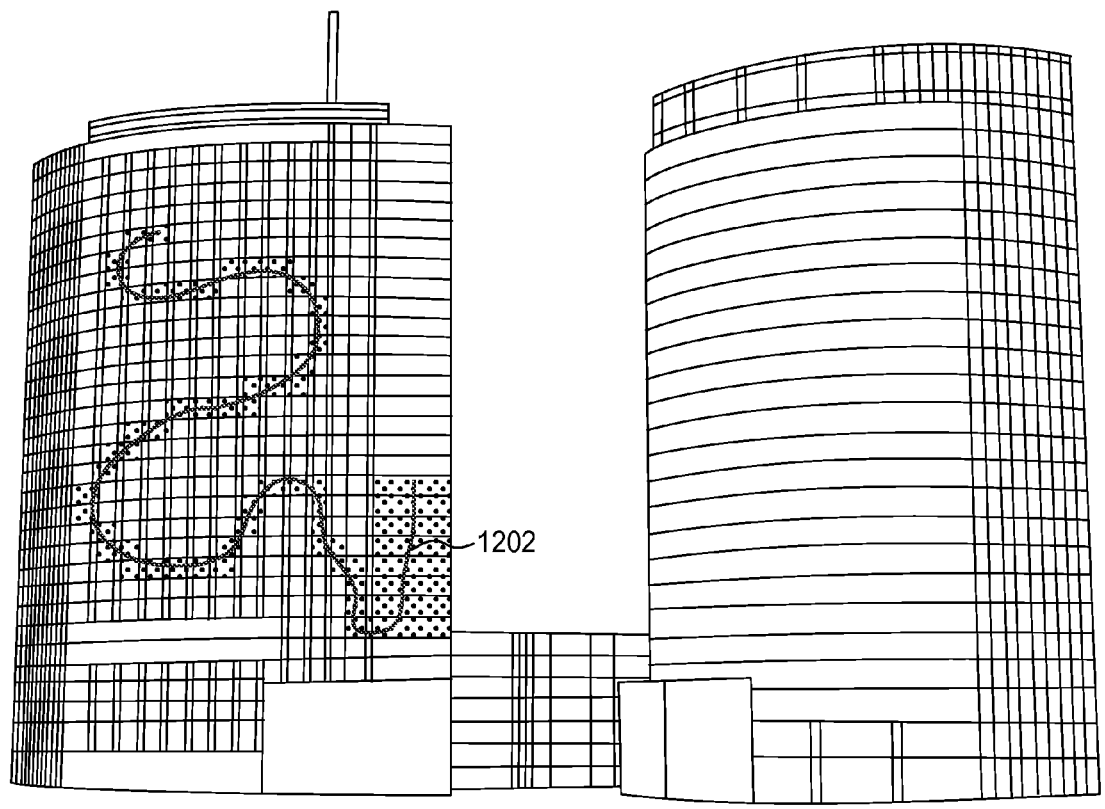
FIG. 12 illustrates an example of a line drawing colorized using a free-hand region filling tool, according to one embodiment of the invention.

FIG. 5 is a flow chart illustrating a method 500 for filling multiple regions of a CAD drawing using a free-hand region filling tool, according to one embodiment of the invention. The method of FIG. 5 is described relative to an example shown in FIG. 12. As shown in FIG. 5, at step 502, the graphics application receives a selection of a graphical style. In one embodiment, the selection may be a user clicking on a particular graphical style from a list of available graphical styles in a graphical style library. In another embodiment, the selection of the graphical style of step 502 may be the selection of a color. In the example shown in FIG. 12, a "polka dot" graphical style has been selected. At step 504, the user activates the free-hand region filling tool. At step 506, the user interacts with the free-hand region filling tool to construct a path. With free-hand region filling, the user may construct the path by clicking and holding down a mouse button while dragging the mouse over the drawing. For example, FIG. 12 shows a drawing after the user has constructed a path 1202. At step 508, the graphics application determines which closed regions of the drawing intersect the path, based on an analysis of the planar graph. Step 508 can be performed using any method known to persons skilled in the art. At step 510, the graphics application applies the selected graphical style to the closed regions drawing that intersect the path. As shown in FIG. 9, a polka dot graphical style has been applied to the closed regions of the drawing that intersect path 1202. Path 1202 can be selectively hidden or visible. In another embodiment, pressure sensitivity may be used by the graphics application to give some width to the profile of the path to express a hit zone. In another embodiment, graphical styles may be modified based on the number of times a path intersects a particular region. For example, if two regions share a boundary and the user creates a path that moves back and forth over the regions in a repetitive way, the color fill for those areas could be darkened or the opacity could be increased, depending on parameters set by the user.

Figure 6:
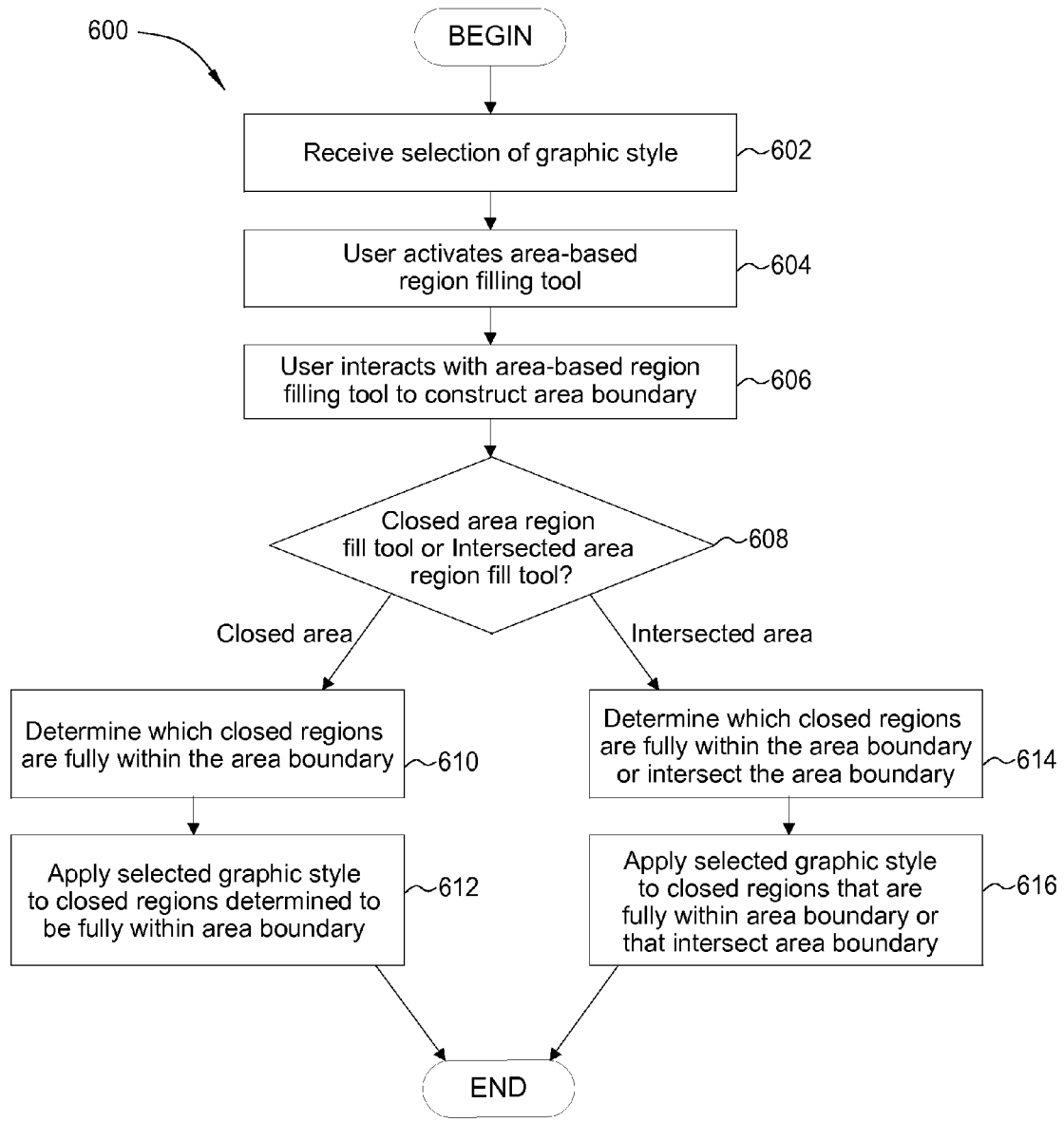
FIG. 6 is a flow chart illustrating a method for filling multiple regions of a CAD drawing using an area-based region filling tool, according to one embodiment of the invention.

FIG. 6 is a flow chart illustrating a method 600 for filling multiple regions of a drawing using an area-based region filling tool, according to one embodiment of the invention. The method of FIG. 6 is described relative to examples shown in FIGS. 10-11. As shown in FIG. 6, at step 602, the graphics application receives a selection of a graphical style. In one embodiment, the selection may be a user clicking on a particular graphical style from a list of available graphical styles in a graphical style library. In another embodiment, the selection of the graphical style of step 502 may be the selection of a color. In the examples shown in FIGS. 10-11, a "polka dot" graphical style has been selected. At step 604, the user activates the area-based region filling tool, and at step 606, the user interacts with the area-based region filling tool to construct an area boundary (e.g., a rectangle). An example of an area boundary is shown in FIG. 11 as area boundary 1102. At step 608, the graphics application determines if the user is using a closed area region filling tool or an intersected area region filling tool. That is, the user may specify to fill any closed region that intersects the area boundary or, alternatively, only fill regions completely covered by the area boundary. In one embodiment, two separate tools may appear in the GUI interface for each of the closed area region filling tool and the intersected area region filling tool. In another embodiment, if the user creates an area boundary from "left-to-right" the graphics application may recognize that the user is using the closed area region filling tool. If the user creates an area boundary from "right-to-left" the graphics application may recognize that the user is using the intersected area region filling tool. The area boundary can be selectively hidden or visible.

At step 608, if the graphics application determines that the user is using a closed area region filling tool, the method 600 proceeds to step 610 where the graphics application determines which closed regions are fully within the area boundary, based on an analysis of the planar graph. Step 610 can be performed using any method known to persons skilled in the art. At step 612, the graphics application applies the selected graphical style to the closed regions of the planar graph determined to be fully within the area boundary. For example, FIG. 10 shows a user interacting with a closed area region filling tool. In this example, the user has created area boundary 1002 using a "left-to-right" motion 1008. As shown, the user clicks on the drawing at point 1004. Then, while the mouse button is depressed, the user moves the mouse to point 1006 and releases the mouse button. This motion creates area boundary 1002. In FIG. 10, in a two-dimensional XY space, an x-value of point 1006 (end point) is greater than an x-value of point 1004 (start point), indicating that a left-to-right motion 1008 was used to create area boundary 1002. In one embodiment, using a left-to-right motion to create the area boundary indicates that a closed area region filling tool is used. In such a case, the closed regions of the drawing fully within the area boundary are filled with a selected color or graphical style. In FIG. 10, a polka dot graphical style has been applied to the closed regions of the drawing determined to be fully within the area boundary 1002. At the same time, regions not fully covered by the area boundary 1002 do not have the polka dot graphical style applied.

At step 608, if the graphics application determines that the user is using an intersected area region filling tool, the method 600 proceeds to step 614 where the graphics application determines which closed regions intersect the area boundary, based on an analysis of the planar graph. Step 614 can be performed using any method known to persons skilled in the art. At step 616, the graphics application applies the selected graphical style to the closed regions of the planar graph that intersect the area boundary. For example, FIG. 11 shows the user interacting with an intersected area region filling tool. In this example, the user has created an area boundary 1102 using a "right-to-left" motion 1108. As shown, the user clicks on the drawing at point 1004. Then, while the mouse button is depressed, the user moves the mouse to point 1006 and releases the mouse button. This motion creates area boundary 1102. In FIG. 11, in a two-dimensional XY space, an x-value of point 1106 (end point) is less than an x-value of point 1104 (start point), indicating that a right-to-left motion 1108 was used to create area boundary 1102. In one embodiment, creating an area boundary using a right-to-left motion indicates that an intersected area region filling tool is used. In such a case, the closed regions of the drawing determined to intersect the area boundary are filled with a selected color or graphical style. In FIG. 11, a polka dot graphical style has been applied to each closed region of the drawing determined to intersect the area boundary 1102.

Figure 7:
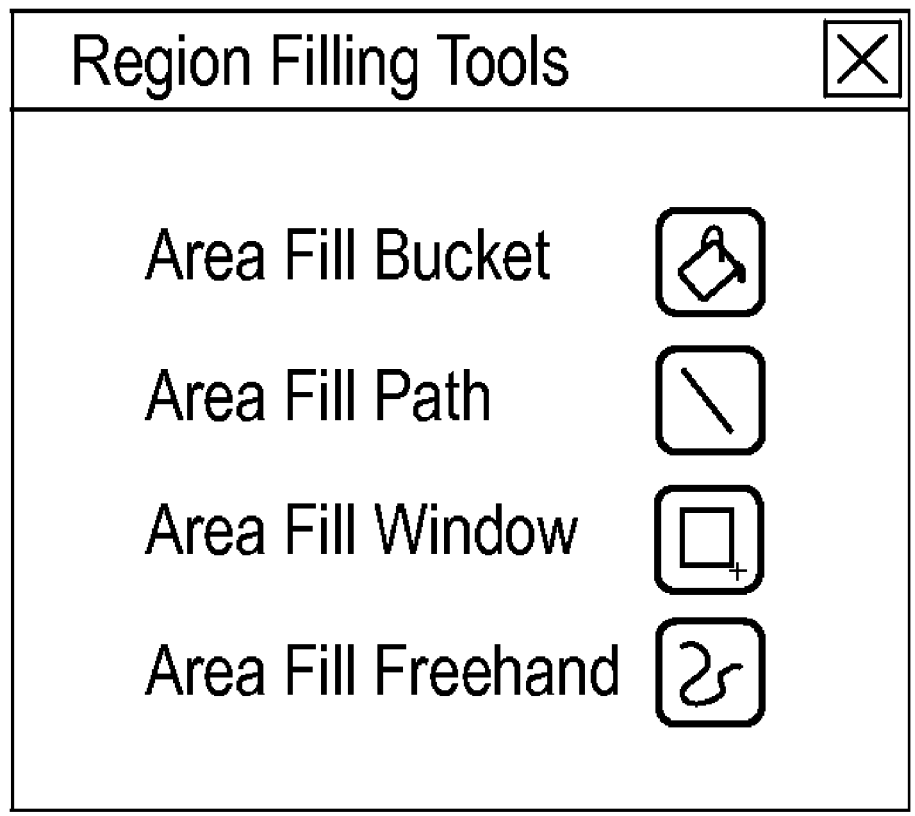
FIG. 7 illustrates a screen shot of a collection of region filling tools, according to one embodiment of the invention.

FIG. 7 illustrates a screen shot of a collection of region filling tools, according to one embodiment of the invention. The GUI interface of FIG. 7 provides an example of a GUI interface for selecting a region filling tool. In one embodiment, available region filling tools may include an area fill bucket (e.g., prior art region filling method of selecting each region to be filled individually), an area fill path (e.g., path-based region filling tool), an area fill window (e.g., area-based region filling tool), or area fill freehand (free-hand region filling tool).

Figure 13:
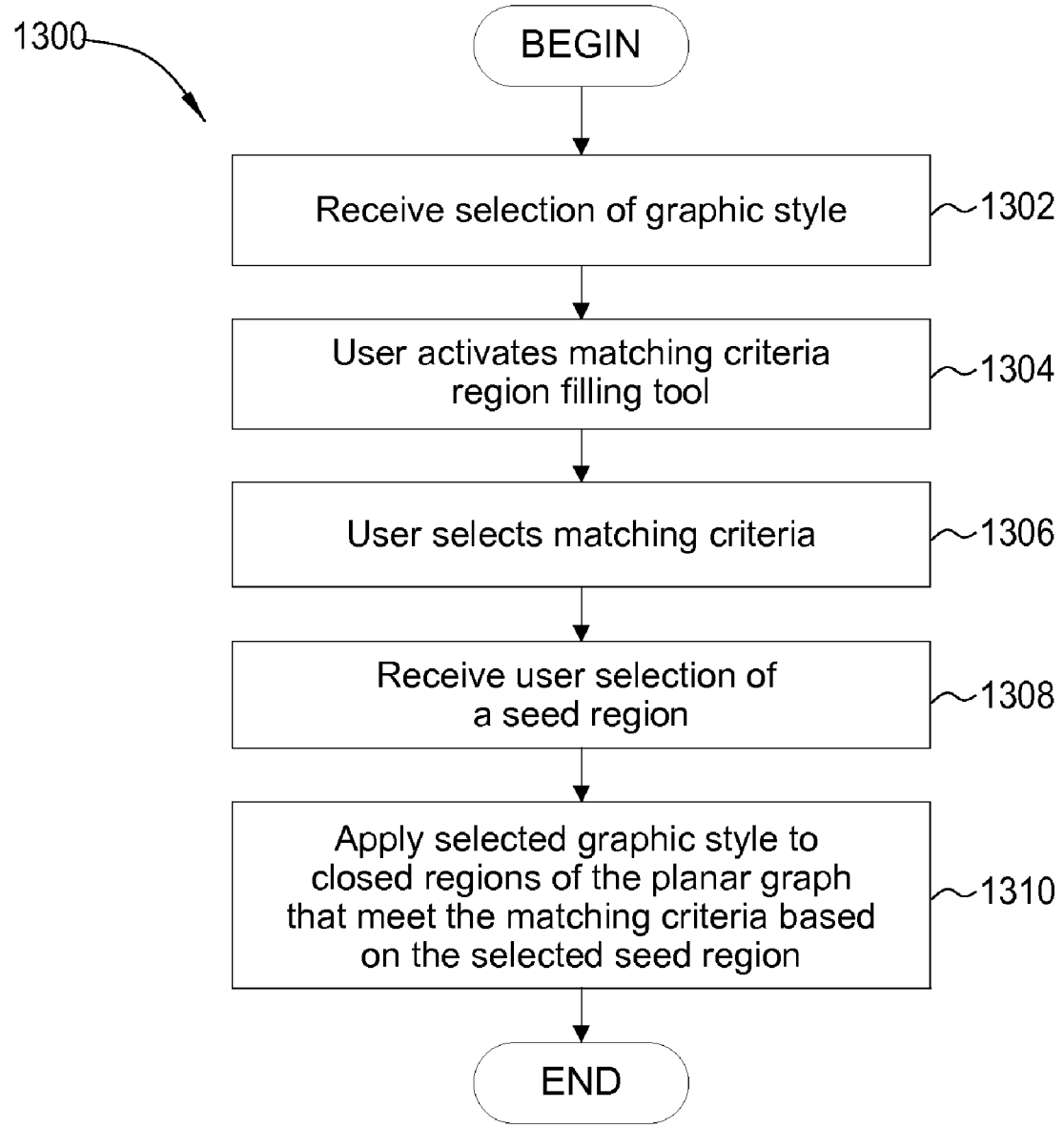
FIG. 13 is a flow chart illustrating a method for filling multiple regions using a matching criteria region filling tool, according to one embodiment of the invention.

FIG. 13 is a flow chart illustrating a method 1300 for filling multiple regions using a matching criteria region filling tool, according to one embodiment of the invention. The method of FIG. 13 is described relative to an example shown in FIGS. 16-19. As shown in FIG. 13, at step 1302, the graphics application receives a selection of a graphical style. In one embodiment, the selection may be a user clicking on a particular graphical style from a list of available graphical styles in a graphical style library. In another embodiment, the selection of the graphical style of step 1302 may be the selection of a color. In the example shown in FIGS. 16-19, a "polka dot" graphical style has been selected. At step 1304, the user activates the matching criteria region filling tool. At step 1306, the user selects matching criteria, as described in more detail with reference to FIG. 14. At step 1308, the graphics application receives a user selection of a seed region. In one embodiment, the user selection of a seed region may be made by clicking a mouse button when the mouse cursor is located within a closed region of the drawing. At step 1310, the graphics application applies the selected graphical style to the closed regions of the drawing that satisfy the matching criteria, based on the selected seed region and an analysis of the planar graph.

Figure 14:
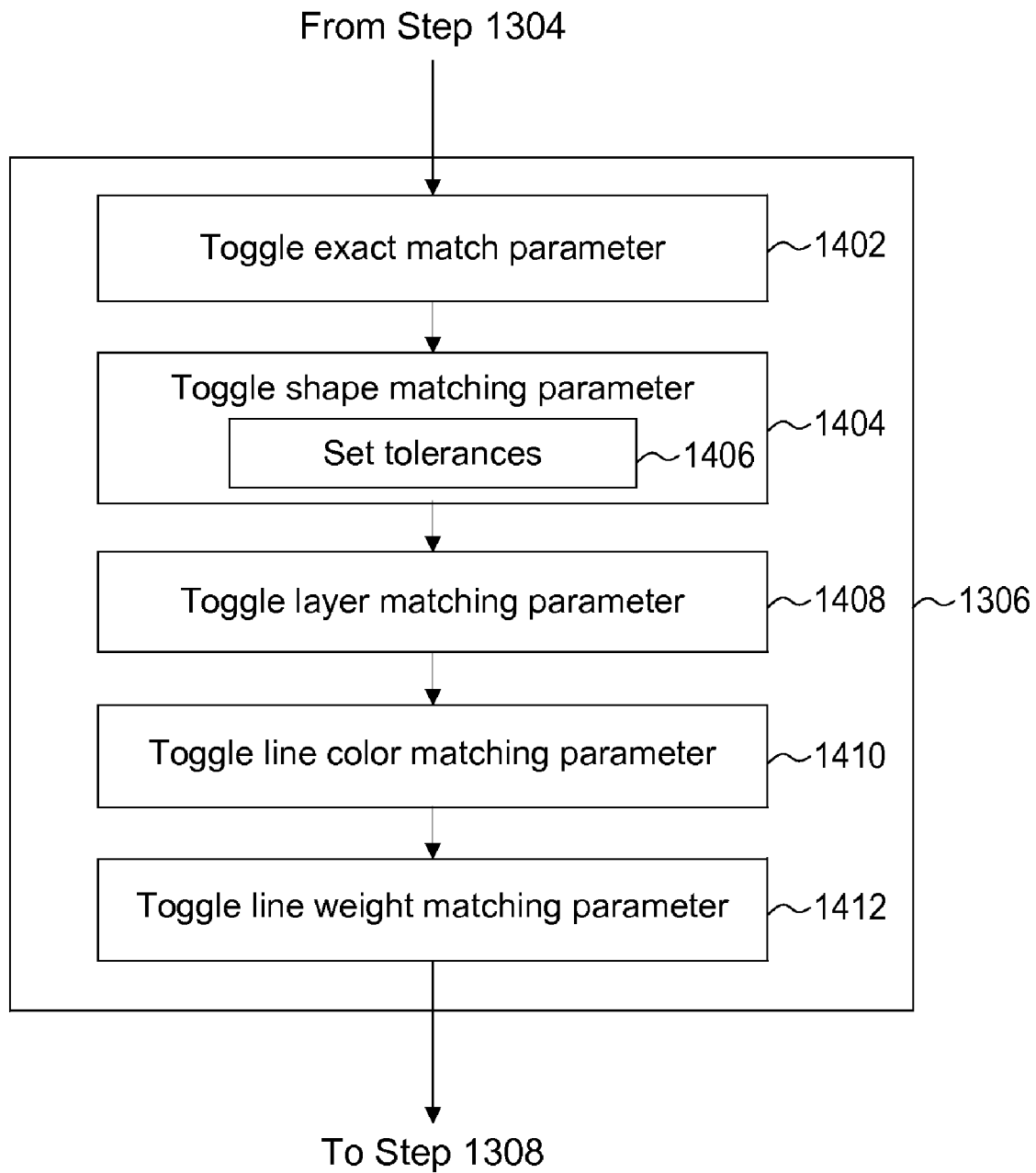
FIG. 14 is a flow chart illustrating a method for selecting matching criteria, according to one embodiment of the invention.

FIG. 14 is a flow chart illustrating a method for selecting matching criteria, according to one embodiment of the invention. As shown, FIG. 14 further illustrates steps that may be performed as part of step 1306 of FIG. 13. At step 1402, an exact match parameter can be toggled. When toggled to on, a given region of the CAD drawing matches a seed region when a closed region exactly matches the structure of the selected seed region.

At step 1404, a shape matching parameter can be toggled. If the shape matching parameter is in an active state, then at step 1406 tolerances for the shape matching parameter can be set. In one embodiment, a shape matching parameter is satisfied when a closed region's area and perimeter fall within a tolerance set at step 1406 with respect to the seed region. For example, if the selected seed region has an area of 20.0 mm$^2$ and a perimeter of 24 mm, and the tolerance is set at 10%, then each closed region in the planar map having both an area between 18.0 mm$^2$ through 22.0 mm$^2$ and having a perimeter between 21.6 mm through 26.4 mm are filled with the selected color or graphical style.

At step 1408, a layer matching parameter can be toggled. In one embodiment, lines and objects in a CAD drawing are associated with layers of the CAD drawing. These layer associations for lines in a CAD drawing are preserved when the planar graph is generated for the CAD drawing (e.g., this information may persist in a drawing description associated with the drawing and the planar graph). For example, a CAD drawing may include lines and curves residing on three layers. When the planar graph is generated, the boundary lines that represent each of closed regions may have preserved layer associations. For example, a first closed region of the planar graph may have boundary lines that reside on the first and second layers in the CAD drawing (e.g., a four-side closed region in which two of the sides reside in the first layer of the CAD drawing and the remaining two sides reside in the second layer of the CAD drawing). A second closed region of the planar graph may have boundary lines that reside on the first, second, and third layers in the CAD drawing (e.g., a four-side closed region in which two of the sides reside in the first layer of the CAD drawing, one side resides in the second layer of the CAD drawing, and one side resides in the third layer of the CAD drawing). If the layer matching parameter is in an active state, and the first closed region (two sides in first layer and two sides in second layer) is selected as the seed region, then only the closed regions whose boundary lines reside in both the first and second layers, but not the third layer, are filled with the selected color or graphical style. In this example, the second closed region (two sides in first layer, one side in second layer, and one side in third layer) are not filled with the selected color or graphical style because the layer associations of the second closed region are different than the layer associations of the seed region (first closed region).

At step 1410, a line color matching parameter can be toggled. In one embodiment, line color associations for lines in a CAD drawing may persist in a drawing description created when the CAD drawing is converted to a planar graph. For example, a CAD drawing may contain lines and curves of three colors, including a first color, a second color, and a third color. When the CAD application generates a planar graph of closed regions, the boundary lines that make up each of the closed regions have preserved line color associations. For example, a first closed region of the planar graph may have boundary lines of the first and second colors (e.g., a four-side closed region in which two of the sides are of the first color and the remaining two sides are of the second color). A second closed region of the planar graph may have boundary lines that are of the first, second, and third colors (e.g., a four-side closed region in which two of the sides are of the first color, one side is of the second color, and one side is of the third color). If the line color matching parameter is in an active state, and the first closed region (two sides of a first color and two sides of a second color) is selected as a seed region, then only the closed regions whose boundary lines are of the first and second colors, but not the third color, are filled with the selected color or graphical style. In this example, the second closed region (two sides of first color, one side of second color, and one side of third color) are not filled with the selected color or graphical style because the line color associations of the second closed region are different than the line color associations of the seed region (first closed region).

At step 1412, a line weight matching parameter can be toggled. In one embodiment, line weight associations for lines in a CAD drawing may persist in a drawing description created when the CAD drawing is converted to a planar graph. For example, a CAD drawing may contain lines and curves of three weights, including a first weight, a second weight, and a third weight. When the CAD application generates the planar graph of closed regions, the boundary lines that make up each of the closed regions have preserved line weight associations. A user first selects a seed region for matching criteria region filling. If the line weight matching parameter is in an active state, then the selected color or graphical style is applied to the closed regions that have boundary lines of the same line weights as the line weights of the seed region, similar to layer matching and line color matching.

Figure 15:
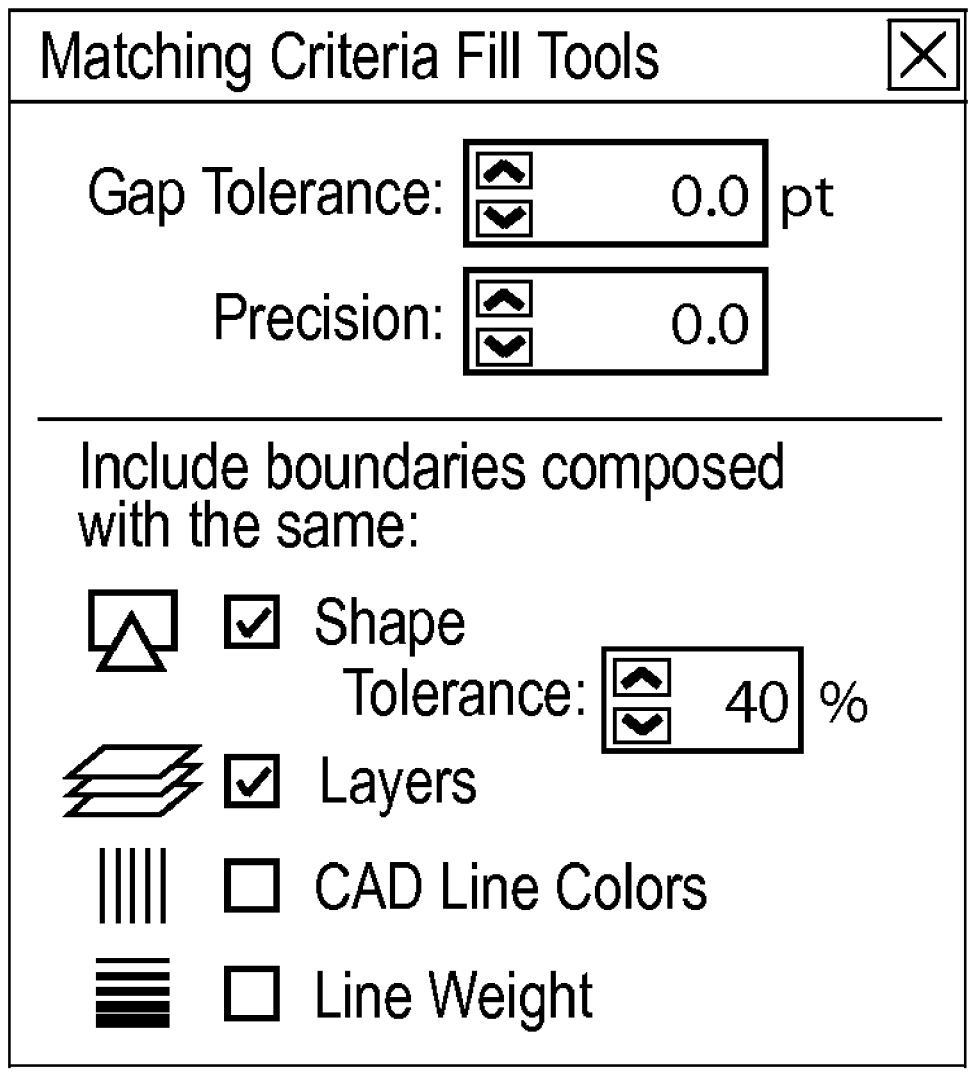
FIG. 15 is a screen shot of a dialog box used to select matching criteria for region filling, according to one embodiment of the invention.

FIG. 15 is a screen shot of a dialog box used to select matching criteria for region filling, according to one embodiment of the invention. Shape matching parameters, layer matching parameters, line color matching parameters, and line weight matching parameters can be used in conjunction with one another using Boolean toggles. As shown in FIG. 15, shape matching parameters, with an area/perimeter tolerance set at 40%, are used in conjunction with layer matching parameters, indicated by check-marks adjacent to those two parameters. Thus, in order for a closed region of the planar graph to be considered a "match" using the matching criteria specified for this example, a particular closed region must have a shape within the 40% area/perimeter tolerance and must have boundaries that reside in the same layers. Each of the matching criteria parameters may be used independently or in conjunction with other matching criteria parameters when determining if a closed region "matches" to a seed region.

Figure 16:
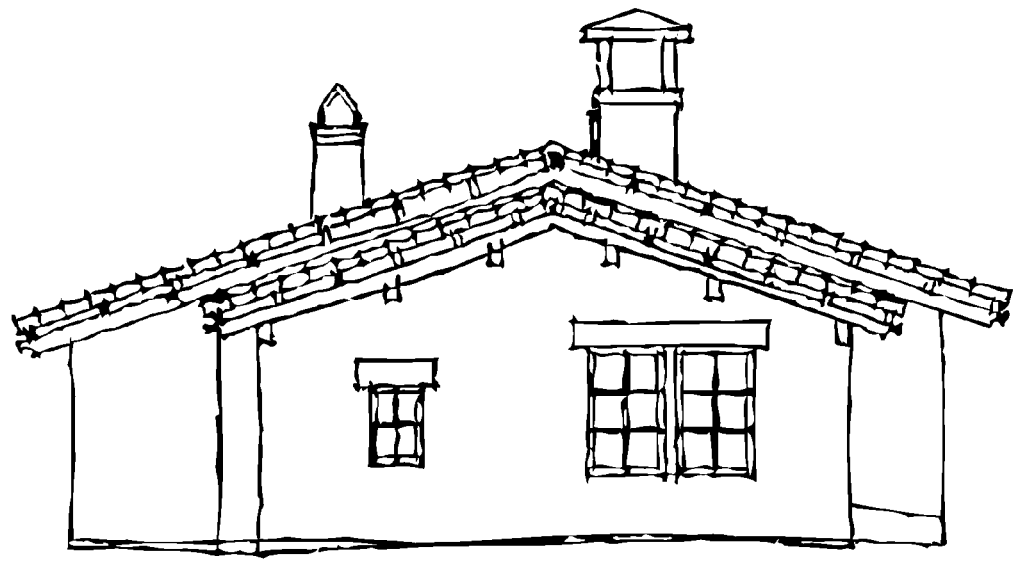
FIG. 16 illustrates an example of a drawing to be colorized using a region filling tool, according to one embodiment of the invention.

FIGS. 16-19 show an example of a drawing to be colorized using a matching criteria region filling tool, according to one embodiment of the invention. FIG. 16 shows a drawing of a house. A user of the graphics application may wish to colorize elements of this drawing using matching criteria region filling tools. For example, in FIGS. 16-19, the user wishes to colorize the drawing with a polka dot graphical style using matching criteria region filling tools.

Figure 17:
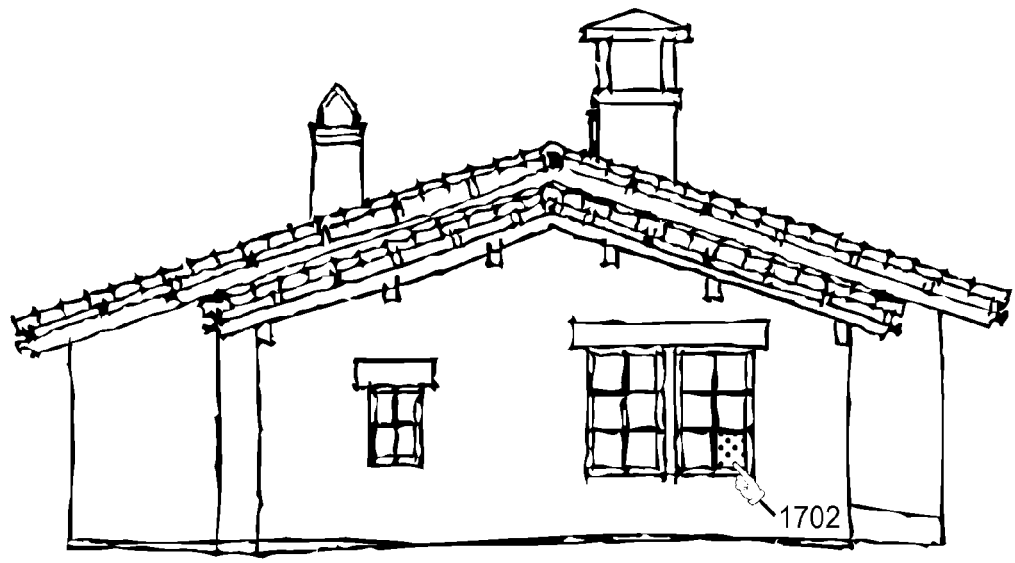
FIG. 17 illustrates an example drawing where a user has selected a seed region for region filling based on matching criteria, according to one embodiment of the invention.

FIG. 17 shows an example of the user selecting a seed region 1702. Specifically, the seed region 1702 is the bottom-right pane of six-paned window. In one embodiment, when the user moves the mouse over a prospective seed region, the graphics application displays highlighted outlines (not shown) of the current prospective seed region and other closed regions that would be filled based on a current setting of matching criteria and the current prospective seed region. Once the user selects seed region 1702, other closed regions deemed to "match" based on the current matching criteria are filled with the selected graphical style.

Figure 18:
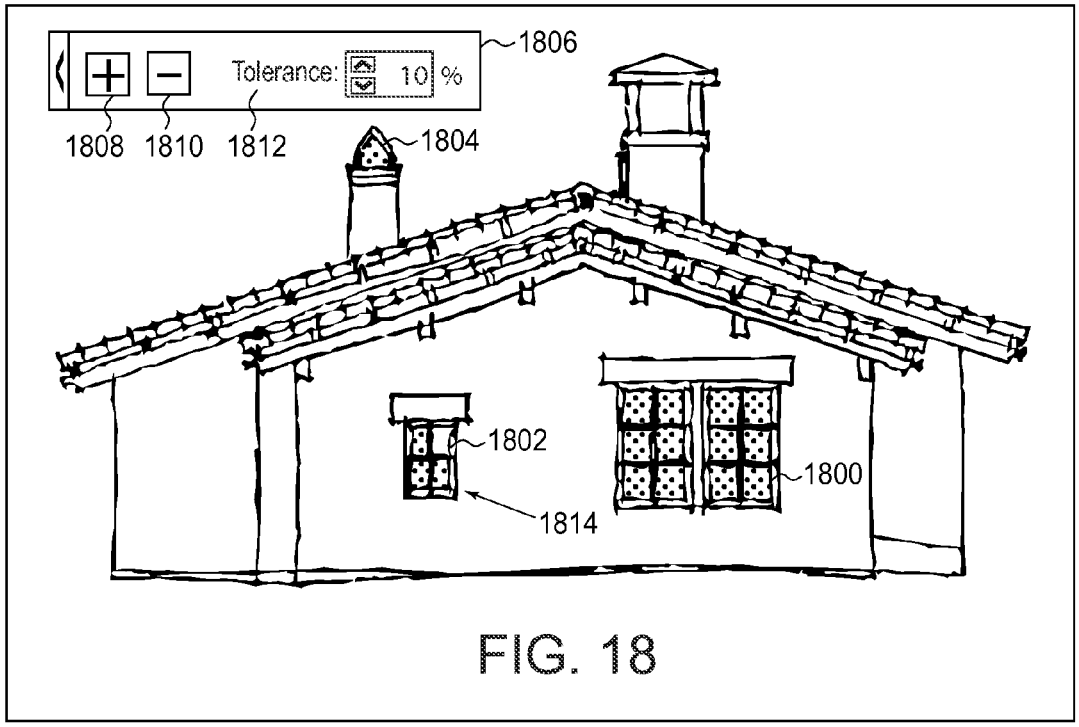
FIG. 18 illustrates an example of a drawing with multiple regions selected and filled using matching criteria supplied to a region filling tool, according to one embodiment of the invention.

FIG. 18 shows the closed regions that are filled when a seed region 1800 is selected using a shape matching parameter shown in dialog 1806 with a tolerance 1812 set at 10%. Each closed region meeting the matching criteria are filled with a polka-dot style. As can be seen in FIG. 18, closed region 1804 was filled with the polka dot style because the area and perimeter of closed region 1804 are within the 10% tolerance 1812 with respect to the area and perimeter of the seed region 1800. The seed region 1800 is part of a window and closed region 1804 is part of a chimney, thus, the user may wish not to fill closed region 1804 with the same graphical style as the seed region 1800. Accordingly, a user may add closed region 1804 to an exclusion list by clicking on the remove button 1810 and selecting closed region 1804. When closed region 1804 is added to the exclusion list, closed region 1804 is no longer filled with the same polka dot graphical style. By contrast, closed region 1802 was not deemed a "match" to the seed region 1800. In this example, a window 1814 is drawn with uneven segments that do not form straight lines. Because not every window pane in window 1814 is exactly the same size, some of the window panes fall outside the 10% tolerance while other window panes fall within the 10% tolerance. For example, closed region 1802 falls outside of the 10% tolerance, and thus was not filled with the polka dot graphical style. The user may manually add closed region 1802 to a list of matching closed regions by clicking on an add button 1808 and selecting closed region 1802. When closed region 1802 is added to the match list, closed region 1802 is filled with the polka dot graphical style.

Figure 19:
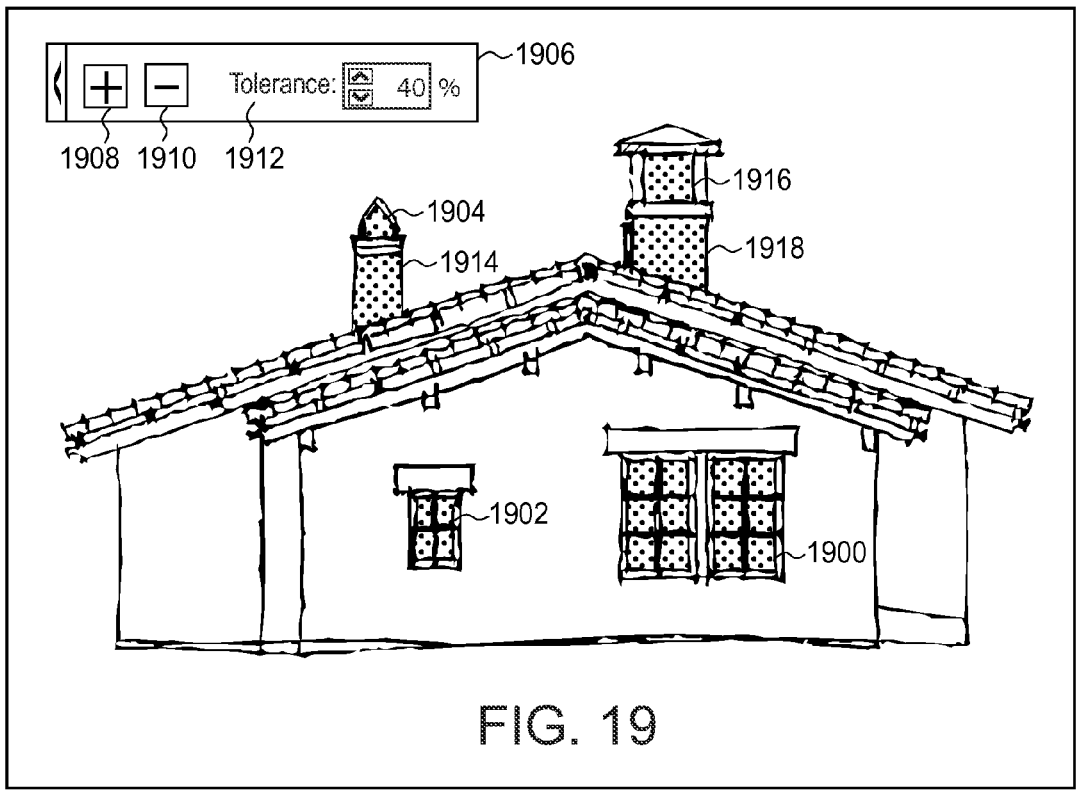
FIG. 19 illustrates an example of a drawing colorized using matching criteria supplied to a region filling tool, according to one embodiment of the invention.

FIG. 19 shows the closed regions filled when a seed region 1900 using a shape matching parameter, as shown in dialog 1906. Further, in this example, a tolerance 1912 set to 40%. Closed regions 1902, 1904, 1914, 1916, and 1918 were among the closed regions deemed "matches" to closed region 1900. Thus, closed regions 1902, 1904, 1914, 1916 and 1918 are each filled with the polka dot graphical style. Comparatively, more regions matched seed the region 1900 when the tolerance is increased from 10% (as shown in FIG. 18) to 40% (as shown in FIG. 19). The user may use the remove button 1910 and the add button 1908 to remove or add more closed regions from the lists of closed regions to be filled or not filled.

As described, embodiments of the invention provide a more sophisticated region filling tool. In particular, a region filling tool where the user can fill multiple regions with one interaction with the region filling tool.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method of filling closed regions in a line drawing with a graphical style, comprising:
   parsing the line drawing to identify a collection of closed regions present in the line drawing, wherein the line drawing includes one or more line segments, each line segment is associated with a layer of the line drawing;
   generating a planar graph representation of the collection of closed regions present in the line drawing, wherein the planar graph includes information that indicates a correspondence between each line segment in the line drawing and the associated layer of the line drawing;
   receiving user input specifying a portion of the line drawing;
   determining, from the user input and the planar graph representation of the collection of closed regions, a subset of the closed regions present in the line drawing covered by the specified portion of the line drawing; and
   applying, via a processor, the graphical style to the subset of the closed regions present in the line drawing.

2. The method of claim 1, wherein the step of receiving user input specifying a portion of the line drawing comprises receiving input defining a path, and the step of determining the subset of the closed regions present in the line drawing comprises determining each closed region that intersects the path.

3. The method of claim 2, wherein the path includes one or more linear segments traversing over a portion of the line drawing.

4. The method of claim 2, further comprising the step of receiving a selection of a second line drawing, and the step of applying the graphical style to the closed regions in the second line drawing comprises applying the graphical style to each closed region in the second line drawing that intersect the path.

5. The method of claim 1, wherein an exclusion list defines one or more closed regions covered by the specified portion of the line drawing to which the graphical style is not applied.

6. The method of claim 1, wherein the step of receiving user input specifying a portion of the line drawing comprises receiving input defining a two-dimensional area covering a portion of the line drawing, and the step of determining the subset of the closed regions present in the line drawing comprises determining one or more closed regions completely covered by the two-dimensional area.

7. The method of claim 1, wherein the step of receiving user input specifying a portion of the line drawing comprises receiving input defining a two-dimensional area covering a portion of the line drawing, and the step of determining the subset of the closed regions present in the line drawing comprises determining one or more closed regions that intersect with any portion of the line drawing covered by the two-dimensional area.

8. A non-transitory computer-readable storage medium storing instructions that when executed by a processor cause the processor to fill a region in a line drawing by performing the steps of:
   parsing the line drawing to identify a collection of closed regions present in the line drawing, wherein the line drawing includes one or more line segments, each line segment is associated with a layer of the line drawing;
   generating a planar graph representation of the collection of closed regions present in the line drawing, wherein the planar graph includes information that indicates a correspondence between each line segment in the line drawing and the associated layer of the line drawing;
   receiving user input specifying a portion of the line drawing;
   determining, from the user input and the planar graph representation of the collection of closed regions, a subset of the closed regions present in the line drawing covered by the specified portion of the line drawing; and
   applying the graphical style to the subset of the closed regions present in the line drawing.

9. The computer-readable storage medium of claim 8, wherein the step of receiving user input specifying a portion of the line drawing comprises receiving input defining a path, and the step of determining the subset of the closed regions present in the line drawing comprises determining each closed region that intersects the path.

10. The computer-readable storage medium of claim 9, wherein the path includes one or more linear segments traversing over a portion of the line drawing.

11. The computer-readable storage medium of claim 9, wherein the steps further comprise, receiving a selection of a second line drawing, and the step of applying the graphical style to the closed regions in the second line drawing comprises applying the graphical style to each closed region in the second line drawing that intersect the path.

12. The computer-readable storage medium of claim 8, wherein an exclusion list defines one or more closed regions covered by the specified portion of the line drawing to which the graphical style is not applied.

13. The computer-readable storage medium of claim 8, wherein the step of receiving user input specifying a portion of the line drawing comprises receiving input defining a two-dimensional area covering a portion of the line drawing, and the step of determining the subset of the closed regions present in the line drawing comprises determining one or more closed regions completely covered by the two-dimensional area.

14. The computer-readable storage medium of claim 8, wherein the step of receiving user input specifying a portion of the line drawing comprises receiving input defining a two-dimensional area covering a portion of the line drawing, and the step of determining the subset of the closed regions present in the line drawing comprises determining one or more closed regions that intersect with any portion of the line drawing covered by the two-dimensional area.

15. A method of filling closed regions in a line drawing with a graphical style, comprising:
   specifying a selection of a line drawing and a selected graphical style; and
   invoking a region filling tool provided by a graphics application, wherein the region filling tool is configured to perform the steps of:
      parsing the line drawing to identify a collection of closed regions present in the line drawing, wherein the line drawing includes one or more line segments, each line segment is associated with a layer of the line drawing,
      generating a planar graph representation of the collection of closed regions present in the line drawing, wherein the planar graph includes information that indicates a correspondence between each line segment in the line drawing and the associated layer of the line drawing,
      receiving user input specifying a portion of the line drawing,
      determining, from the user input and the planar graph representation of the collection of closed regions, a subset of the closed regions present in the line drawing covered by the specified portion of the line drawing, and
      applying, via a processor, the graphical style to the subset of the closed regions present in the line drawing.

16. The method of claim 15, wherein the step of receiving user input specifying a portion of the line drawing comprises receiving input defining a path, and the step of determining the subset of the closed regions present in the line drawing comprises determining each closed region that intersects the path.

17. The computer-readable storage medium of claim 16, wherein the path includes one or more linear segments traversing over a portion of the line drawing.

18. The method of claim 16, wherein the steps further comprise, receiving a selection of a second line drawing, and the step of applying the graphical style to the closed regions in the second line drawing comprises applying the graphical style to each closed region in the second line drawing that intersect the path.

\* \* \* \* \*